US010732837B2

(12) United States Patent
Weiss (10) Patent No.: US 10,732,837 B2
(45) Date of Patent: Aug. 4, 2020

(54) PSEUDO-VOLUME FOR CONTROL AND STATISTICS OF A STORAGE CONTROLLER

(75) Inventor: Gary Weiss, Haifa (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 578 days.

(21) Appl. No.: 12/701,751

(22) Filed: Feb. 8, 2010

(65) Prior Publication Data

US 2011/0196846 A1 Aug. 11, 2011

(51) Int. Cl.
*G06F 3/06* (2006.01)

(52) U.S. Cl.
CPC ............ *G06F 3/0604* (2013.01); *G06F 3/067* (2013.01); *G06F 3/0629* (2013.01); *G06F 3/0653* (2013.01)

(58) Field of Classification Search
USPC ........................................................ 707/827
See application file for complete search history.

(56) References Cited

U.S. PATENT DOCUMENTS

| | | | |
|---|---|---|---|
| 6,081,849 A * | 6/2000 | Born | G06F 3/0611 710/20 |
| 6,487,562 B1 * | 11/2002 | Mason, Jr. | G06F 3/0605 |
| 6,570,593 B1 * | 5/2003 | Bowers et al. | 715/775 |
| 6,799,255 B1 | 9/2004 | Blumenau et al. | |
| 6,907,414 B1 * | 6/2005 | Parnell | G06F 16/40 706/47 |
| 7,146,481 B2 | 12/2006 | Krehbiel, Jr. et al. | |
| 7,353,334 B2 | 4/2008 | Horn et al. | |
| 7,353,358 B1 * | 4/2008 | Marokhovsky | G06F 3/0605 707/999.102 |
| 7,376,772 B2 | 5/2008 | Fallon | |
| 2002/0112113 A1 * | 8/2002 | Karpoff | G06F 3/0605 711/4 |
| 2003/0120751 A1 * | 6/2003 | Husain et al. | 709/219 |
| 2004/0205294 A1 * | 10/2004 | Nakayama | G06F 3/0605 711/114 |
| 2004/0215600 A1 * | 10/2004 | Aridor | G06F 16/986 |
| 2005/0195660 A1 * | 9/2005 | Kavuri | G06F 3/0605 365/189.05 |
| 2005/0228963 A1 * | 10/2005 | Rothman | G06F 3/0613 711/170 |

(Continued)

OTHER PUBLICATIONS

Callaghan et al. "RFC 1813—NFS Version 3 Protocol Specification". Jun. 1995. URL Link: https://tools.ietf.org/html/rfc1813. Accessed May 2018.*

(Continued)

*Primary Examiner* — Neveen Abel Jalil
*Assistant Examiner* — Irene Baker
(74) *Attorney, Agent, or Firm* — Griffiths & Seaton PLLC (57) ABSTRACT

Exemplary method, system, and computer program embodiments for facilitating information between at least one host and a storage controller operational in a data storage subsystem are provided. In one embodiment, a pseudo-volume, mappable to the at least one host and mountable as a filesystem, is initialized. The pseudo-volume is adapted for performing at least one of providing diagnostic and statistical data representative of the data storage subsystem to the at least one host, and facilitating control of at least one parameter of the storage controller.

14 Claims, 7 Drawing Sheets

(56) References Cited

U.S. PATENT DOCUMENTS

| | | | |
|---|---|---|---|
| 2006/0129527 A1* | 6/2006 | Li | G06F 16/3323 |
| 2006/0161752 A1* | 7/2006 | Burkey | G06F 3/0605 |
| | | | 711/170 |
| 2007/0088981 A1* | 4/2007 | Noble et al. | 714/26 |
| 2007/0113222 A1* | 5/2007 | Dignum | G06F 17/2705 |
| | | | 717/143 |
| 2007/0276966 A1 | 11/2007 | Paul et al. | |
| 2008/0091897 A1* | 4/2008 | Bartlett | G06F 11/0727 |
| | | | 711/162 |
| 2008/0147961 A1* | 6/2008 | Seki | G06F 3/0608 |
| | | | 711/100 |
| 2008/0256144 A1* | 10/2008 | Peters et al. | 707/204 |
| 2009/0172347 A1 | 7/2009 | Jokura | |
| 2009/0276714 A1* | 11/2009 | Kandlikar | G06F 3/0481 |
| | | | 715/734 |
| 2010/0191774 A1* | 7/2010 | Mason, Jr. | G06F 11/1446 |
| | | | 707/797 |
| 2011/0066654 A1* | 3/2011 | Chandrasekar | G06F 17/30451 |
| | | | 707/792 |

OTHER PUBLICATIONS

Storage Networking Industry Association (SNIA). "Storage Virtualization". 2004. SNIA Technical Tutorial. pp. 3. URL Link: https://www.snia.org/sites/default/files/sniavirt.pdf. Accessed May 2018.*
TechTerms. "Mount". Apr. 16, 2008. Sharpened Productions. URL Link: https://techterms.com/definition/mount. Accessed May 2018.*
Wikipedia. "File Allocation Table". Aug. 31, 2009 snapshot via Archive.org. URL Link: https://en.wikipedia.org/wiki/File_Allocation_Table. Accessed May 2018.*
Wikipedia. "New Technology File System". Feb. 9, 2009 snapshot via Archive.org. URL Link: http://en.wikipedia.org/wiki/NTFS. Accessed May 2018.*
RFC. WebNFS Client Specification. Oct. 1996. URL Link: <https://tools.ietf.org/html/rfc2054>. Accessed Dec. 2019. (Year: 1996).*
Zar. Ch. 7 (Memory System Design) taken from "Computer Systems Design and Architecture", 1st ed. 2001. URL Link: <https://classes.engineering.wustl.edu/cse362/images/8/89/Ch7CSDA.pdf>. Accessed Dec. 2019. (Year: 2001).*
Singh et al.; "Server-Storage Virtualization: Integration and Load Balancing in Data Centers"; ACM Digital Library/IEEE: Nov. 2008.

* cited by examiner

| Component ID | Status | Currently Functioning | Capacity (GB) | Target Status | Model | Size | Serial |
|---|---|---|---|---|---|---|---|
| 1:Disk:7:1 | OK | yes | 1TB | Disk | HUA721010KLA330 | 924772 | PAHN5NUF |
| 1:Disk:7:10 | OK | yes | 1TB | Disk | HUA721010KLA330 | 924772 | PAHJH8TF |
| 1:Disk:7:11 | OK | yes | 1TB | Disk | HUA721010KLA330 | 924772 | PAHMZKKF |
| 1:Disk:7:12 | OK | yes | 1TB | Disk | HUA721010KLA330 | 924772 | PAHN2K1F |
| 1:Disk:7:2 | OK | yes | 1TB | Disk | HUA721010KLA330 | 924772 | PAHMZAKF |
| 1:Disk:7:3 | OK | yes | 1TB | Disk | HUA721010KLA330 | 924772 | PAHN862F |
| 1:Disk:7:4 | OK | yes | 1TB | Disk | HUA721010KLA330 | 924772 | PAHL5HPF |
| 1:Disk:7:5 | OK | yes | 1TB | Disk | HUA721010KLA330 | 924772 | PAHN7YLF |
| 1:Disk:7:6 | OK | yes | 1TB | Disk | HUA721010KLA330 | 924772 | PAHN4GGF |
| 1:Disk:7:7 | OK | yes | 1TB | Disk | HUA721010KLA330 | 924772 | PAHLXTEF |
| 1:Disk:7:8 | OK | yes | 1TB | Disk | HUA721010KLA330 | 924772 | PAHMTX4F |
| 1:Disk:7:9 | OK | yes | 1TB | Disk | HUA721010KLA330 | 924772 | PAHN2Y5F |

FIG. 4

| Name | Size (GB) | Master Name | Consistency Group | Pool | Creator | Used Capacity (GB) |
|---|---|---|---|---|---|---|
| vol-loree-22b | 34 | | | TLIB_AUTO_POOL | xiv_development | 0 |
| vol-lormoy-1ea | 34 | | | TLIB_AUTO_POOL | xiv_development | 0 |
| vol-lukose-1c8 | 17 | | | TLIB_AUTO_POOL | xiv_development | 0 |
| vol-lund-larsen-33d | 17 | | | TLIB_AUTO_POOL | xiv_development | 0 |
| vol-macdermot-1c9 | 34 | | | TLIB_AUTO_POOL | xiv_development | 0 |
| vol-makie-214 | 17 | | | TLIB_AUTO_POOL | xiv_development | |
| vol-makie-214.snapshot_00002 | 17 | vol-makie-214 | | TLIB_AUTO_POOL | xiv_development | 0 |
| vol-malinde-372 | 34 | | | TLIB_AUTO_POOL | xiv_development | |
| vol-malinde-372.snapshot_00001 | 68 | vol-malinde-372 | | TLIB_AUTO_POOL | xiv_development | 0 |
| vol-malsom-116 | 34 | | | TLIB_AUTO_POOL | xiv_development | |
| vol-malsom-116.snapshot_00001 | 34 | vol-malsom-116 | | TLIB_AUTO_POOL | xiv_development | 0 |
| vol-manganaris-24a | 17 | | | TLIB_AUTO_POOL | xiv_development | 0 |
| vol-mann-070 | 17 | | | TLIB_AUTO_POOL | xiv_development | 4 |
| vol-mantharam-394 | 34 | | | TLIB_AUTO_POOL | xiv_development | 8 |
| vol-margaux-21c | 137 | | | TLIB_AUTO_POOL | xiv_development | 0 |
| vol-margaux-21c.snapshot_00001 | 137 | vol-margaux-21c | | TLIB_AUTO_POOL | xiv_development | |
| vol-margaux-21c.snapshot_00002 | 137 | vol-margaux-21c | | TLIB_AUTO_POOL | xiv_development | |
| vol-margaux-21c.snapshot_00003 | 137 | vol-margaux-21c | | TLIB_AUTO_POOL | xiv_development | |
| vol-margaux-21c.snapshot_00004 | 137 | vol-margaux-21c | | TLIB_AUTO_POOL | xiv_development | |
| vol-margaux-21c.snapshot_00005 | 137 | vol-margaux-21c | | TLIB_AUTO_POOL | xiv_development | |
| vol-marinho-0fa | 34 | | | TLIB_AUTO_POOL | xiv_development | 0 |
| vol-marinho-0fa.snapshot_00002 | 34 | vol-marinho-0fa | | TLIB_AUTO_POOL | xiv_development | |
| vol-marjukka-341 | 51 | | | TLIB_AUTO_POOL | xiv_development | 14 |

FIG. 5

| Index | Code | Severity | Timestamp | Alerting | Cleared User |
|---|---|---|---|---|---|
| 2 | BIOS_VERSION_UNEXPECTED | Warning | 2008-10-12 16:59:32 | no | yes |
| 3 | EVENTS_WERE_NOT_SAVED | Minor | 2008-10-12 16:59:47 | no | yes |
| 4 | BIOS_VERSION_UNEXPECTED | Warning | 2008-10-12 16:59:32 | no | yes |
| 5 | BIOS_VERSION_UNEXPECTED | Warning | 2008-10-12 16:59:40 | no | yes |
| 6 | TAKE_OVER | Informational | 2008-10-12 16:59:39 | no | yes |
| 7 | TAKE_OVER | Informational | 2008-10-12 16:59:39 | no | yes |
| 8 | TAKE_OVER | Informational | 2008-10-12 16:59:39 | no | yes |
| 9 | START_WORK | Informational | 2008-10-12 16:59:59 | no | yes |
| 10 | WOULD_BE_EMERGENCY_SHUTDOWN | Critical | 2008-10-12 17:05:42 | no | yes |

PSEUDO-VOLUME FOR CONTROL AND STATISTICS OF A STORAGE CONTROLLER

BACKGROUND OF THE INVENTION

Field of the Invention

The present invention relates in general to computers, and more particularly to apparatus, method and computer program product embodiments for facilitating information between at least one host and a storage controller operational in a data storage subsystem.

Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Storage architectures often include one or more storage controllers responsible for a certain number of storage devices under their control. In this regard, storage controllers facilitate providing one or more interfaces between the user and the storage devices while managing one or more storage aspects such as redundant array of independent disks (RAID) configurations, failover, replication, snapshots, and the like.

Storage controllers are managed via such mechanisms as application program interfaces (APIs), command line interfaces (CLIs), and graphical user interfaces (GUIs). Over the course of storage operation, a number of user data may be transferred between the host computer, as well as additional statistical data (non-user data) concerning the user data. In some situations, particularly when enterprise controllers are implemented in large storage architectures, this statistical and related data may be too large for collection and transfer over traditional management connections such as transfer control protocol/internet protocol (TCP/IP), and would instead benefit from translation over host-preferred data mechanisms.

In view of the foregoing, a need exists for a mechanism whereby statistical, debugging, diagnostic, and related data are presented to the host computer for manipulation via a host-preferred data connection. Accordingly, various exemplary method, apparatus, and computer program product embodiments for facilitating information between at least one host and a storage controller operational in a data storage subsystem are provided. In one embodiment, a pseudo-volume, mappable to the at least one host and mountable as a filesystem, is initialized. The pseudo-volume is adapted for performing at least one of providing diagnostic and statistical data representative of the data storage subsystem to the at least one host, and facilitating control of at least one parameter of the storage controller.

In addition to the foregoing exemplary embodiment, various other method, apparatus, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 5 is a table of exemplary storage pool information provided in accordance with an embodiment of the present invention;

DETAILED DESCRIPTION OF THE DRAWINGS

The illustrated embodiments introduce a "control pseudo-volume" available to one or more host computers, which may be mapped to the volume. The pseudo-volume is not intended to be a "real" volume for purposes of data storage as traditional storage volumes are configured. However, the host computer may map to the pseudo-volume as if the volume were real, and may, in one embodiment of the present invention, mount the pseudo-volume as a filesystem.

The mountable filesystem may be adapted to be viewed by the host computer in a browsable representation. For example, the mountable filesystem may be organized in hierarchical structure as will be further described. When browsing the filesystem, the host computer may find control information, statistical information, debugging information, and specialized control files, for example, which may be written to in order to submit commands. In this way, a user at the host computer may visualize one or more structures in the computing storage environment as seen through the storage controller, and may extend and explore the structure(s) in similar fashion to the way that a traditional filesystem is extended and explored.

Figure 1:
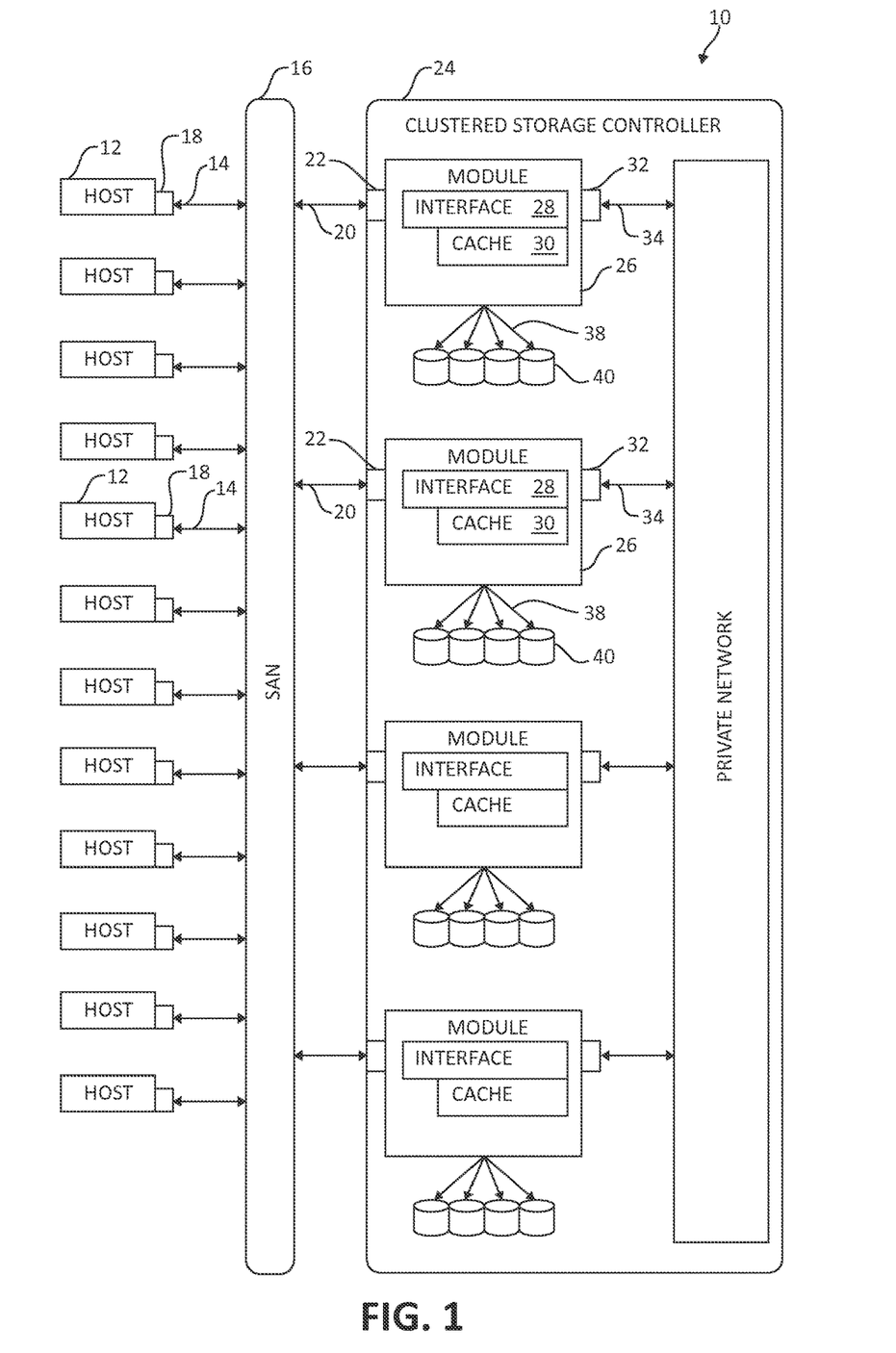
FIG. 1 is a block diagram of an exemplary computing storage environment in accordance with certain embodiments.

Turning now to the drawings, reference is initially made to FIG. 1, which is a block diagram of an exemplary data processing storage subsystem 10, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

The storage subsystem 10 receives, from one or more host computers 12, input/output (I/O) requests, which are commands to read or write data at logical addresses on logical volumes. Any number of host computers 12 is coupled to the storage subsystem 10 by any means known in the art, for example, using a network. Herein, by way of example, the host computers 12 and the storage subsystem 10 are assumed to be coupled by a Storage Area Network (SAN) 16 incorporating data connections 14 and Host Bus Adapters (HBAs) 18. The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume. The storage subsystem 10 typically operates in, or as, a network attached storage (NAS) or a SAN system.

The storage subsystem 10 comprises a clustered storage controller 24 coupled between the SAN 16 and private network 36 using data connections 20 and 34, respectively, and incorporating adapters 22 and 32, again respectively. Clustered storage controller 24 implements clusters of storage modules 26, each of whom includes an interface 28 (in communication between adapters 22 and 32), and a cache 30. Each storage module 26 is responsible for a number of disks 40 by way of data connection 38 as shown.

As described previously, each storage module 26 further comprises a cache 30. However, it will be appreciated that the number of caches used in the storage subsystem 10 and in conjunction with clustered storage controller 24 may be any convenient number. While all caches 30 in the storage subsystem 10 may operate in substantially the same manner and to comprise substantially similar elements, this is not a requirement. Each of the caches 30 is typically, but not necessarily approximately equal in size and is assumed to be coupled, by way of example, in a one-to-one correspondence with a set of physical storage units, which are typically disks. In one embodiment, the disks 40 may comprise such disks. Those skilled in the art will be able to adapt the description herein to caches of different sizes.

Each set of physical storage comprises multiple slow and/or fast access time mass storage devices, herein below assumed to be multiple hard disks. FIG. 1 shows the caches 30 coupled to respective sets of physical storage. Typically, the sets of physical storage comprise one or more disks 40, which can have different performance characteristics. In response to an I/O command, the cache 30, by way of example, may read or write data at addressable physical locations of physical storage. In the embodiment of FIG. 1, the caches 30 are shown to exercise certain control functions over the physical storage. These control functions may alternatively be realized by hardware devices such as disk controllers, which are linked to the caches 30.

Routing records, indicating the association of logical addresses of logical volumes with partitions and the association of the partitions with caches, are distributed by the SAN 16 to one or more generally similar network interfaces 28 of the storage modules 26. It will be understood that the storage subsystem 10, and thereby, the clustered storage controller 24, may comprise any convenient number of network interfaces 28. Subsequent to the formation of the disks 40, the network interfaces 28 receive I/O commands from the host computers 12 specifying logical addresses of the disks 40. The network interfaces use the routing records to break the commands into I/O instructions, or command subsets, that are then distributed among the caches 30.

Each storage module 26 is operative to monitor its state, including the states of associated caches 30, and to transmit configuration information to other components of the storage subsystem 10 for example, configuration changes that result in blocking intervals, or limit the rate at which I/O requests for the sets of physical storage are accepted.

Routing of commands and data from the HBAs 18 to the clustered storage controller 24 to each cache 30 is typically performed over a network and/or a switch. Herein, by way of example, the HBAs 18 may be coupled to the storage modules 26 by at least one switch (not shown) of the SAN 16, which can be of any known type having a digital cross-connect function. In addition, the HBAs 18 may be directly coupled to the storage modules 26 in an additional implementation.

Data having contiguous logical addresses are generally distributed among the disks 40. Alternatively, the data can be distributed using other algorithms, e.g., byte or block interleaving. In general, this increases bandwidth, for instance, by allowing a volume in a SAN or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of the disks 40.

While not explicitly shown for purposes of illustrative simplicity, the skilled artisan will appreciate that in some embodiments, the clustered storage controller 24 may be adapted for implementation in conjunction with certain hardware, such as a rack mount system, a midplane, and/or a backplane. Indeed, the private network 36 in one embodiment may be implemented using a backplane. Additional hardware such as the aforementioned switches, processors, controllers, memory devices, and the like may also be incorporated into the clustered storage controller 24 and elsewhere within the storage subsystem 10, again as the skilled artisan will appreciate. Further, a variety of software components, operating systems, firmware, and the like may be integrated.

Figure 2:
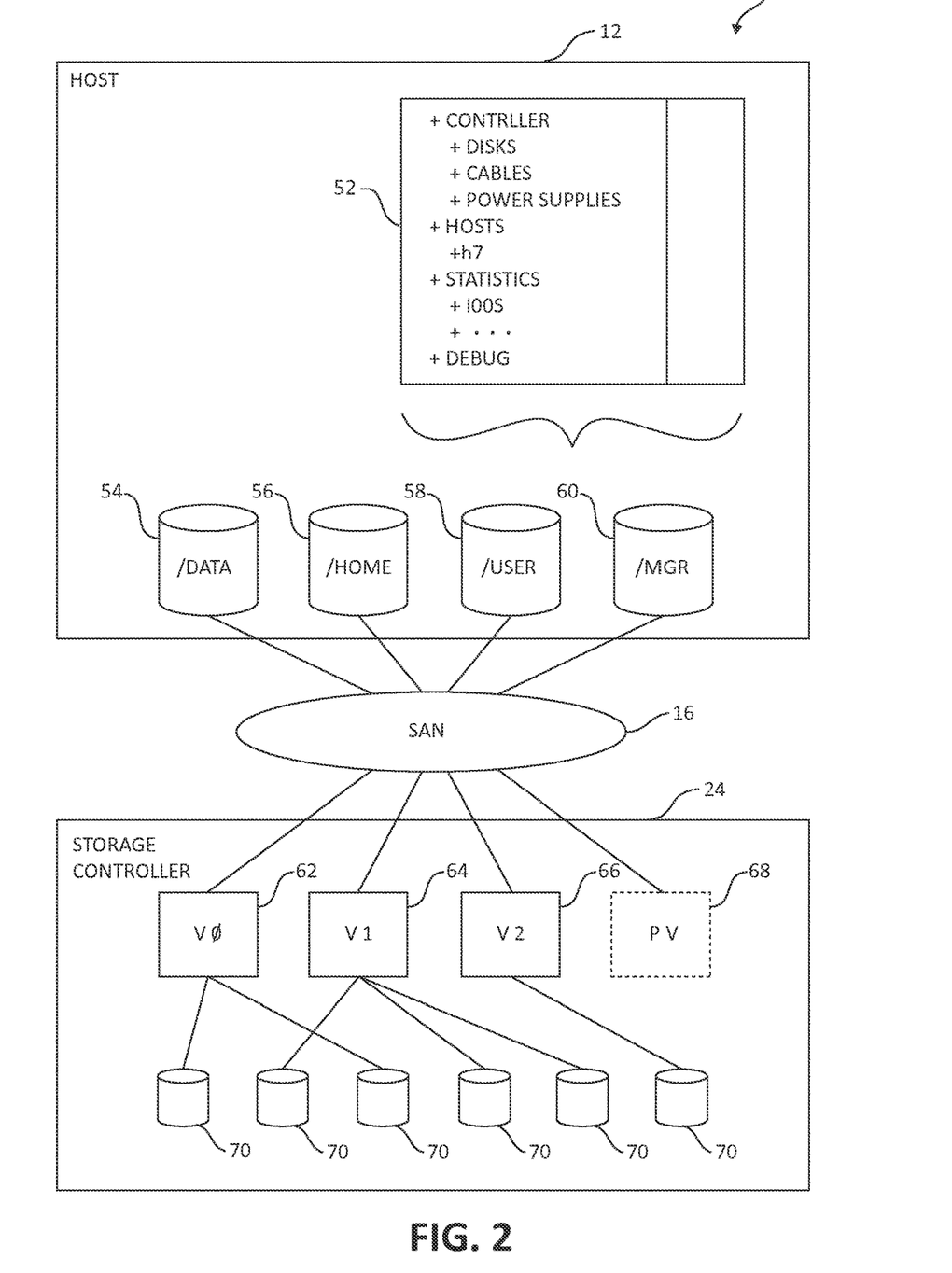
FIG. 2 is a block diagram of an exemplary pseudo-volume accessible by one or more host computers and facilitated by a storage controller in an environment such as the computing storage environment depicted in FIG. 1.

Turning to FIG. 2, in view of FIG. 1, an exemplary pseudo-volume accessible by one or more host computers and facilitated by a storage controller in a computing environment 50 such as the computing storage environment depicted in FIG. 1 is illustrated. Environment 50 includes a host computer 12 interconnected via SAN 16 to a storage controller 24 as shown. A number of filesystems 54 (/data), 56 (/home), 58 (/user), and 60 (mgr) are mounted on host 12 and respectively mapped to one or more volumes V0 (denoted by reference number 62), V1 (denoted by reference number 64), V2 (denoted by reference number 66), and the pseudo-volume (denoted by reference number 68).

As is shown, each volume 62, 64, and 66 is associated with one or more physical storage devices 70. Storage devices 70 may be configured in a RAID configuration as previously described, or another configuration such as a just a bunch of disks (JBOD) or similar configuration as one of ordinary skill in the art will appreciate.

Pseudo-volume 68 is mounted as filesystem /mgr 60 (manager) as shown. Filesystem /mgr 60 may then be opened by a browser application, for example, and extended and searched to display various diagnostic and statistical data 52 on the host 12. Such data may include statistics, debug information, lists of objects, states, events, hardware states, history, adapter information, cable information, performance information, debugging data, and the like. In addition, specialized files may be written to the filesystem 60, according to allowed parameters, to change or control the storage controller 24, again as one of ordinary skill in the art will appreciate.

Diagnostic and statistical data 52 is organized as shown in a hierarchical structure. For example, various storage controller information is associated with the directory leaf "controller" as shown, and may be expanded by a browser operational on the host computer 12, appearing on lower hierarchical levels. This information includes disk information, cable information, and power supply information. Other information may be associated with the controller director leaf as one of ordinary skill in the art will appreciate.

Pseudo-volume 68 may be mountable on the host 12 in alternative embodiments. In one example, the pseudo-volume 68 may be mountable as a database on the host 12. In an additional example, the pseudo-volume 68 may be mounted as an extendable markup language (XML) flat file, or any easily browsable representation that maps onto a flat address space and has a standardized format. In a final example, the pseudo-volume 68 may be a mountable network drive, or remote filesystem complying with protocols such as network file system (NFS) and server message block/common internet file system (SMB/CIFS).

The diagnostic and statistical data presented by the filesystem 60 to the host 12 may be configured in at least two embodiments presently described. In a first exemplary embodiment, the diagnostic and statistical data may not be stored at all, and may de dynamically generated upon request with the assistance of the storage controller 24. In this way, no physical storage need be allocated for the diagnostic and statistical data, as the data represents a snapshot of the computing environment at any one time. In an additional embodiment, the specialized control files, and other diagnostic and statistical information may be allocated to physical storage (e.g., stored on one or more storage devices 70, or elsewhere) as necessary by the storage controller 24.

Figure 3:
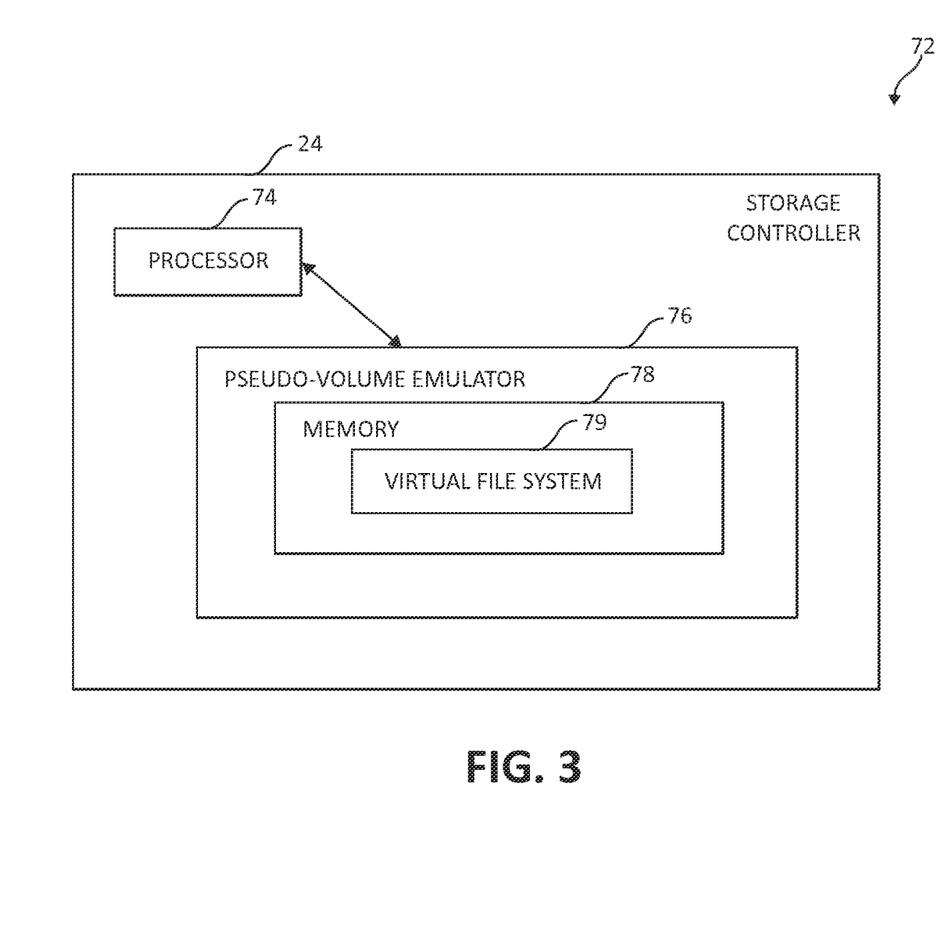
FIG. 3 is a block diagram of exemplary functional elements of the storage controller depicted in FIGS. 1 and 2, previously, including a pseudo-volume emulator.

Turning now to FIG. 3, exemplary functional components 72 of storage controller 24 are further illustrated capable of implementing pseudo-volume 68 in one embodiment of the present invention. Storage controller includes one or more processor devices 74 as will be understood by one of ordinary skill in the art. Processor(s) 74 are in communication between a pseudo-volume emulator 76 operational on storage controller 24.

Pseudo-volume emulator 76 includes one or more memory devices 78. A virtual filesystem 79 is shown operational on the memory device(s) 78. Pseudo-volume emulator 76 may be adapted to initialize the pseudo-volume 68 in the computing environment previously described. In accordance with implementing the pseudo-volume 68, the pseudo-volume emulator 76 may maintain virtual filesystem 79 on memory device(s) 78. Virtual filesystem 79 may, in one embodiment, represent where the diagnostic and statistical information previously described would be stored if such a filesystem existed. In this way, the virtual filesystem 79 is a data structure embodying mappings between the host computer and diagnostic and statistical data of the computing storage environment.

Figure 4:
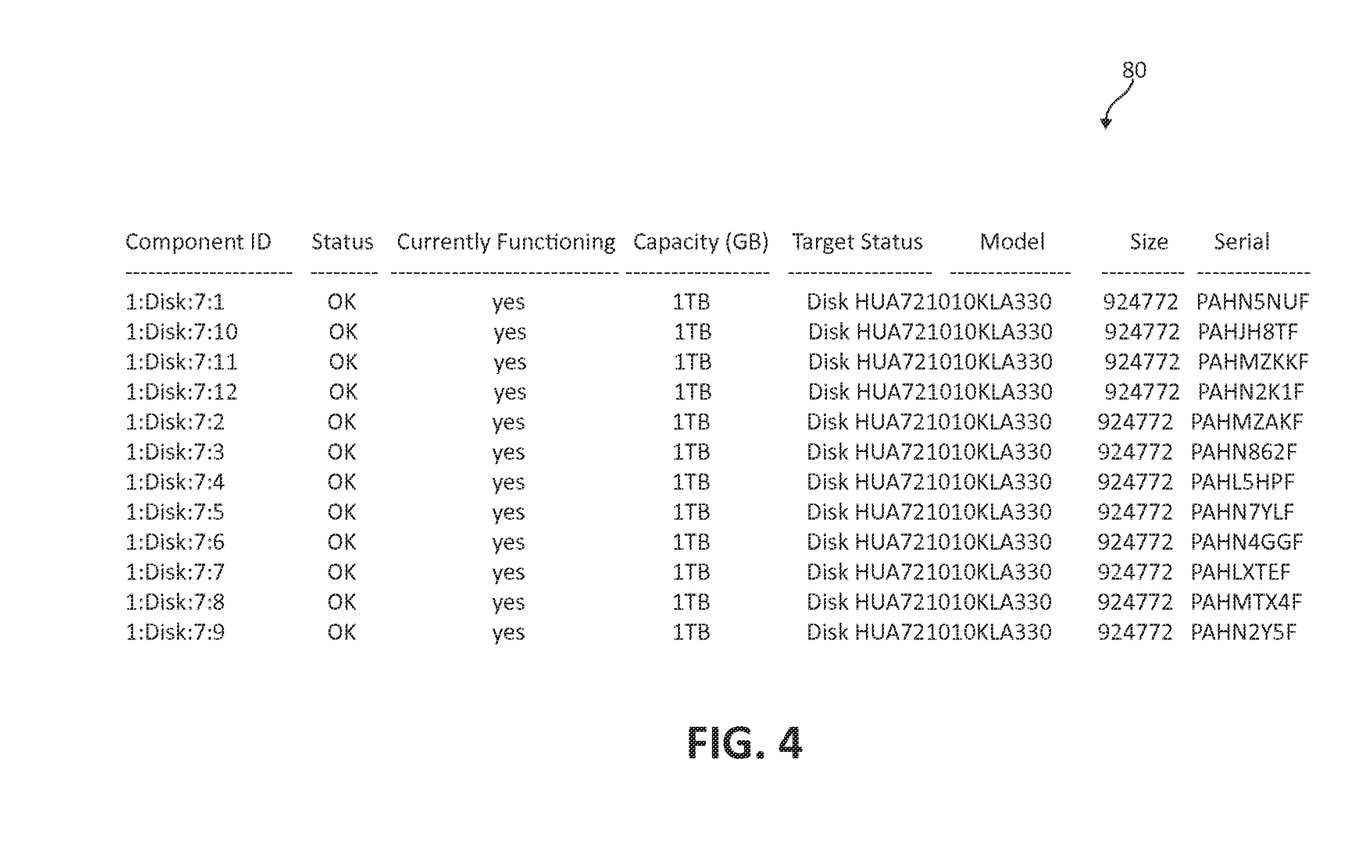
FIG. 4 is a table of exemplary disk information provided in accordance with an embodiment of the present invention.

Turning now to FIG. 4, an exemplary table 80 of diagnostic and statistical data generated by the storage controller, and accessible by a filesystem mounted on a host computer mapped to a pseudo-volume, is illustrated. The diagnostic and statistical data as shown includes information pertaining to a particular storage device (e.g., disk ID), status, whether the device is currently functioning, capacity, target status, the model, size, and serial number as shown. Here again, the information contained in table 80 may be dynamically generated by the storage controller upon request, or may be locally stored on one or more connected storage devices.

The diagnostic and statistical information shown in table 80 may be retrieved pursuant to a specific command directed to a mounted filesystem, such as /mgr shown previously in FIG. 2. This retrieval may function in similar fashion to the way that a list of files are returned in disk operating system (DOS) for a certain drive based on a directory (DIR) command. One of ordinary skill in the art will appreciate that the pseudo-volume and corresponding mounted filesystem may be adapted to function in other similar respects to browsable file directory mechanisms.

Other diagnostic and statistical information is shown in FIG. 5, following. Table 82 includes diagnostic and statistical information regarding certain pools of storage volumes in which the storage controller's filesystem displays upon a query. In the depicted embodiment, a number of storage pools (groups of storage volumes) are organized by name, size, master name, consistency group, pool creator, and used capacity.

Figure 6:
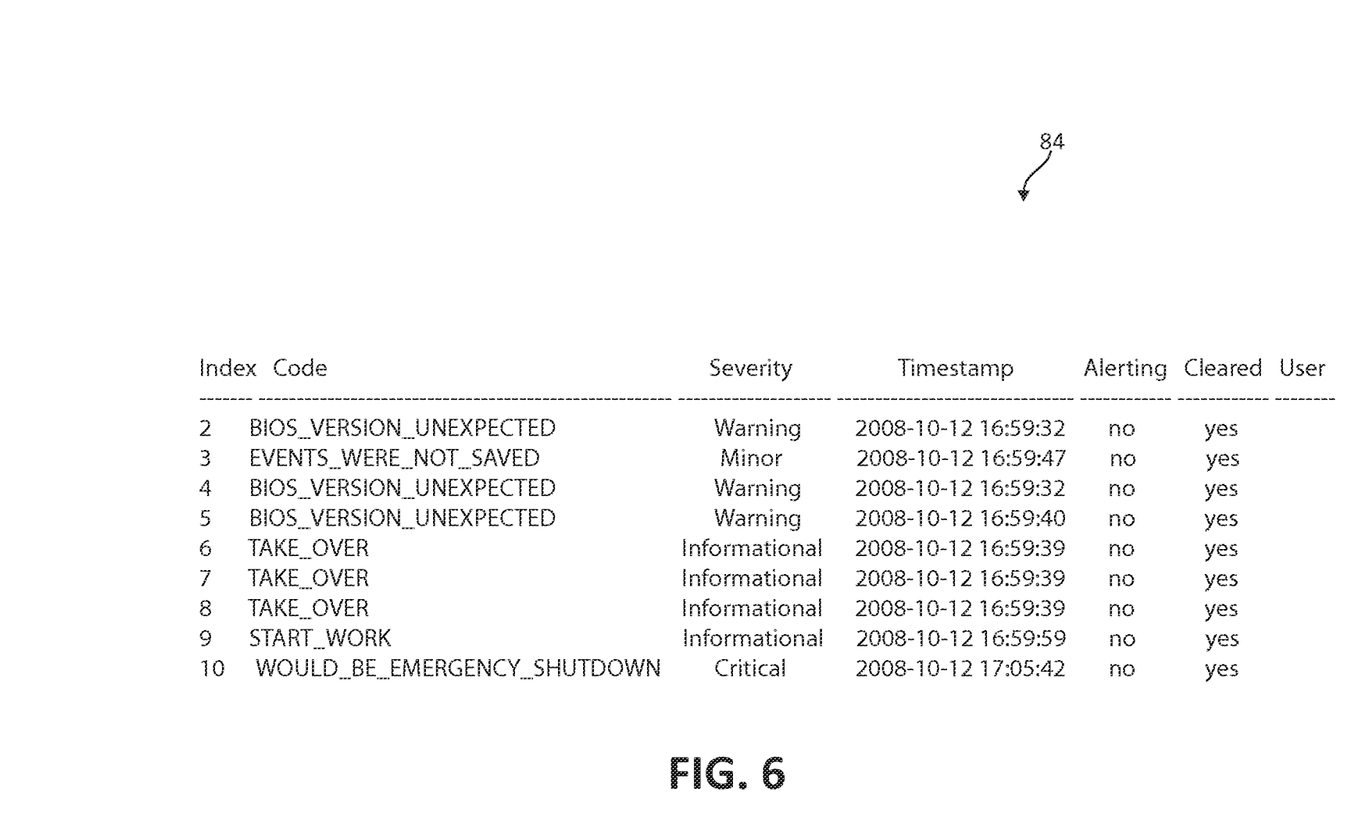
FIG. 6 is a table of exemplary events associated with the computing storage environment provided in accordance with an embodiment of the present invention.

Additional diagnostic and statistical information is shown in FIG. 6, following. Table 84 includes diagnostic and statistical information regarding certain events in the computing storage environment. The information is organized by index code, severity, timestamp, whether the event is currently alerting, whether the event has been cleared, and the user. For example, a particular bios version unexpected event is shown as warning severity, with an accompanying timestamp of Oct. 12, 2008 at 16:59:40. The event is not currently shown as alerting, and is shown as currently cleared.

Figure 7:
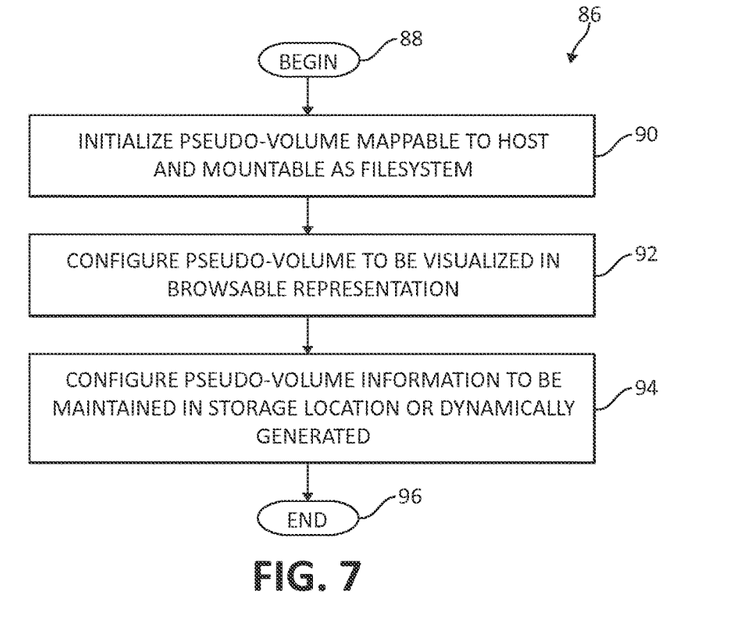
FIG. 7 is a flow chart of an exemplary method for facilitating information between at least one host and a storage controller according to one embodiment of the present invention.
Figure 8:
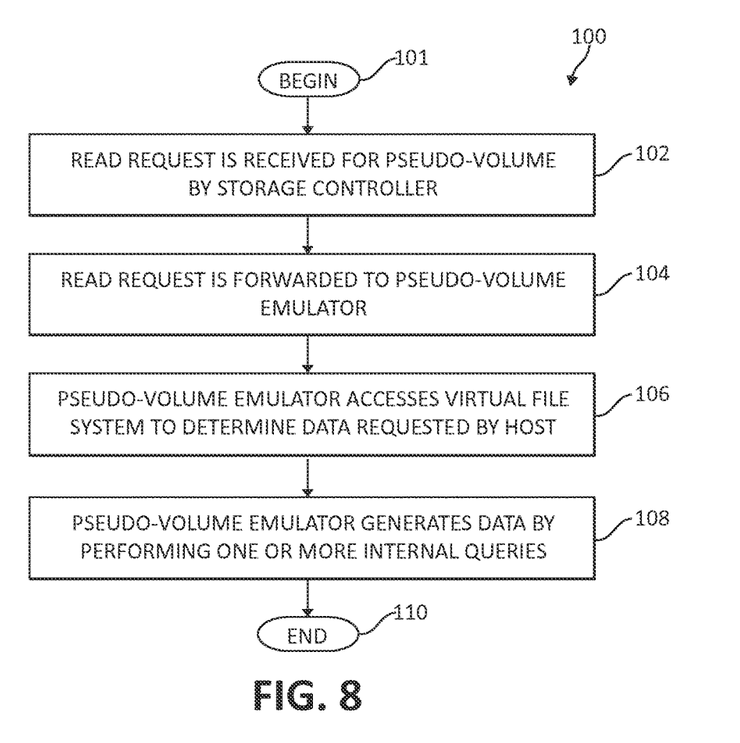
FIG. 8 is a flow chart of an exemplary method for facilitating information between at least one host and a storage controller using a pseudo-volume emulator according to one embodiment of the present invention.

FIGS. 7 and 8, following, illustrate flow-chart diagrams of exemplary methods 86 and 100 for facilitating information between a host computer and a storage controller in a computing storage environment. As one of ordinary skill in the art will appreciate, various steps in the methods 86 and 100 may be implemented in differing ways to suit a particular application. In addition, the described methods may be implemented by various means, such as hardware, software, firmware, or a combination thereof operational on or otherwise associated with the computing storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning first to FIG. 7, method 86 illustrates an exemplary process for initializing a pseudo-volume. Method 86 begins (step 88), with the initialization of a pseudo-volume mappable to the host computer and mountable as a filesystem (step 90). In one embodiment, step 90 is realized by the implementation of a pseudo-volume mounted as a network attached storage (NAS) filesystem.

As a next step, the pseudo-volume is configured to be visualized in a browsable representation (step 92), such as a representation in a hierarchical tree structure as previously described. The pseudo-volume information is configured to be maintained in a storage location (i.e., allocated to physical storage devices), or dynamically generated based on a request provided to the browser, again as previously described (step 94). Method 86 then ends (step 96).

Turning next to FIG. 8, method 100 illustrates an exemplary process for implementing and operating a pseudo-volume. Method 100 begins (step 101) with a read request received for the pseudo-volume by the storage controller (step 102). As a next step, the read request is forwarded to the pseudo-volume emulator by the storage controller (step 104). The pseudo-volume emulator accesses the virtual filesystem to determine data requested by the host (step 106). Based on the virtual filesystem, the pseudo-volume emulator then generates the requested data by performing one or more internal queries (step 108). The method 100 then ends (step 110) as the requested data is returned to the host.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A data storage subsystem comprising an interface between at least one host and a storage controller operational in the data storage subsystem for efficiently transferring diagnostic and statistical data from the storage controller to the at least one host, the storage controller established by a processor device, the at least one host comprising a filesystem manager, and the data storage subsystem comprising:

a pseudo-volume generated in response to receiving a request from the at least one host, the pseudo-volume mapped to the filesystem manager in the at least one host and mounted as a virtual filesystem associated with an extended markup language (XML) flat file mapped onto a flat address space and mounted on the storage controller, wherein the pseudo-volume is generated by a pseudo-volume emulator operational within the storage controller, the pseudo-volume emulator including one or more memory devices maintaining the virtual filesystem, wherein the virtual filesystem represents a location where diagnostic and statistical data of the data storage subsystem would be stored in an existing filesystem of the storage controller, the virtual filesystem embodying mappings between the at least one host computer and the pseudo-volume representing the diagnostic and statistical data of the data storage subsystem, and wherein the pseudo-volume:

provides, upon request by the at least one host by accessing the pseudo-volume in the filesystem manager of the at least one host, the diagnostic and statistical data of the data storage subsystem to the at least one host as displayed within a browser application comprising the filesystem manager such that the diagnostic and statistical data is displayed within the browser application as if the diagnostic and statistical data were part of the virtual filesystem of the pseudo-volume, wherein the diagnostic and statistical data is dynamically generated for transient pseudo-storage such that the diagnostic and statistical data is generated in response to receiving the request from the at least one host and is not allocated storage in a physical storage volume, the diagnostic and statistical data representing a temporary snapshot of the data storage subsystem, enables the at least one host to visualize data structures in the data storage subsystem as seen through the storage controller, and enables the at least one host to control the storage controller by writing, by the at least one host, commands to the storage controller through a control file contained within the pseudo-volume according to allowed parameters; wherein the pseudo-volume mapped to the filesystem in the host is maintained for transferring the diagnostic and statistical data from the storage controller to the at least one host in lieu of using a transfer control protocol/Internet protocol (TCP/IP) management connection; and wherein the diagnostic and statistical data representative of the data storage subsystem includes each one of statistics, debug information, lists of objects, states, events, history, adapter information, cable information, and performance information representative of the data storage subsystem.

2. The data storage subsystem of claim 1, wherein at least one of the pseudo-volume, the diagnostic and statistical data, and the at least one parameter is adapted to be visualized by the at least one host in a browsable representation.

3. The data storage subsystem of claim 2, wherein the browsable representation is organized in a hierarchical structure.

4. The data storage subsystem of claim 1, wherein at least one of the pseudo-volume, the diagnostic and statistical data, and the at least one parameter is maintained by the storage controller in a storage location.

5. The data storage subsystem of claim 1, wherein the pseudo-volume is further adapted for mounting as one of a network drive and remote filesystem compliant with one of network file system (NFS) and server message block/common internet file system (SMB/CIFS) protocols.

6. A method of facilitating information between at least one host and a storage controller operational in a data storage subsystem for efficiently transferring diagnostic and statistical data from the storage controller to the at least one host, the storage controller established by a processor device, the at least one host comprising a filesystem manager, the method comprising:

initializing a pseudo-volume generated in response to receiving a request from the at least one host, the pseudo-volume mapped to the filesystem manager in the at least one host and mounted as a virtual filesystem associated with an extended markup language (XML) flat file mapped onto a flat address space and mounted on the storage controller, wherein the pseudo-volume is generated by a pseudo-volume emulator operational within the storage controller, the pseudo-volume emulator including one or more memory devices maintaining the virtual filesystem, wherein the virtual filesystem represents a location where diagnostic and statistical data of the data storage subsystem would be stored in an existing filesystem of the storage controller, the virtual filesystem embodying mappings between the at least one host computer and the pseudo-volume representing the diagnostic and statistical data of the data storage subsystem, and wherein the pseudo-volume:

provides, upon request by the at least one host by accessing the pseudo-volume in the filesystem manager of the at least one host, the diagnostic and statistical data of the data storage subsystem to the at least one host as displayed within a browser application comprising the filesystem manager such that the diagnostic and statistical data is displayed within the browser application as if the diagnostic and statistical data were part of the virtual filesystem of the pseudo-volume, wherein the diagnostic and statistical data is dynamically generated for transient pseudo-storage such that the diagnostic and statistical data is generated in response to receiving the request from the at least one host and is not allocated storage in a physical storage volume, the diagnostic and statistical data representing a temporary snapshot of the data storage subsystem, enables the at least one host to visualize data structures in the data storage subsystem as seen through the storage controller, and enables the at least one host to control the storage controller by writing, by the at least one host, commands to the storage controller through a control file contained within the pseudo-volume according to allowed parameters; wherein the pseudo-volume mapped to the filesystem in the host is maintained for transferring the diagnostic and statistical data from the storage controller to the at least one host in lieu of using a transfer control protocol/Internet protocol (TCP/IP) management connection; and wherein the diagnostic and statistical data representative of the data storage subsystem includes each one of statistics, debug information, lists of objects, states, events, history, adapter information, cable information, and performance information representative of the data storage subsystem.

7. The method of claim 6, wherein initializing the pseudo-volume further includes configuring at least one of the pseudo-volume, the diagnostic and statistical data, and the at least one parameter to be visualized by the at least one host in a browsable representation.

8. The method of claim 7, wherein configuring at least one of the pseudo-volume, the diagnostic and statistical data, and the at least one parameter to be visualized by the at least one host in the browsable representation includes organizing the browsable representation in a hierarchical structure.

9. The method of claim 6, wherein initializing the pseudo-volume further includes configuring at least one of the pseudo-volume, the diagnostic and statistical data, and the at least one parameter to be maintained by the storage controller in a storage location.

10. The method of claim 6, wherein initializing the pseudo-volume further includes adapting the pseudo-volume for mounting as one of a network drive and remote filesystem compliant with one of network file system (NFS) and server message block/common internet file system (SMB/CIFS) protocols.

11. A computer program product for facilitating information between at least one host and a storage controller operational in a data storage subsystem for efficiently transferring diagnostic and statistical data from the storage controller to the at least one host, the storage controller established by a processor device, the at least one host comprising a filesystem manager and the computer program product comprising a non-transitory computer-readable storage medium having computer-readable program code portions stored therein, the computer-readable program code portions comprising:

a first executable portion for initializing a pseudo-volume generated in response to receiving a request from the at least one host, the pseudo-volume mapped to the filesystem manager in the at least one host and mounted as a virtual filesystem associated with an extended markup language (XML) flat file mapped onto a flat address space and mounted on the storage controller, wherein the pseudo-volume is generated by a pseudo-volume emulator operational within the storage controller, the pseudo-volume emulator including one or more memory devices maintaining the virtual filesystem, wherein the virtual filesystem represents a location where diagnostic and statistical data of the data storage subsystem would be stored in an existing filesystem of the storage controller, the virtual filesystem embodying mappings between the at least one host computer and the pseudo-volume representing the diagnostic and statistical data of the data storage subsystem, and wherein the pseudo-volume:

provides, upon request by the at least one host by accessing the pseudo-volume in the filesystem manager of the at least one host, the diagnostic and statistical data of the data storage subsystem to the at least one host as displayed within a browser application comprising the filesystem manager such that the diagnostic and statistical data is displayed within the browser application as if the diagnostic and statistical data were part of the virtual filesystem of the pseudo-volume, wherein the diagnostic and statistical data is dynamically generated for transient pseudo-storage such that the diagnostic and statistical data is generated in response to receiving the request from the at least one host and is not allocated storage in a physical storage volume, the diagnostic and statistical data representing a temporary snapshot of the data storage subsystem, enables the at least one host to visualize data structures in the data storage subsystem as seen through the storage controller, and enables the at least one host to control the storage controller by writing, by the at least one host, commands to the storage controller through a control file contained within the pseudo-volume according to allowed parameters; wherein the pseudo-volume mapped to the filesystem in the host is maintained for transferring the diagnostic and statistical data from the storage controller to the at least one host in lieu of using a transfer control protocol/Internet protocol (TCP/IP) management connection; and wherein the diagnostic and statistical data representative of the data storage subsystem includes each one of statistics, debug information, lists of objects, states, events, history, adapter information, cable information, and performance information representative of the data storage subsystem.

12. The computer program product of claim 11, further including a second executable portion for, pursuant to initializing the pseudo-volume, configuring at least one of the pseudo-volume, the diagnostic and statistical data, and the at least one parameter to be visualized by the at least one host in a browsable representation.

13. The computer program product of claim 12, further including a third executable portion for, pursuant to configuring at least one of the pseudo-volume, the diagnostic and statistical data, and the at least one parameter to be visualized by the at least one host in the browsable representation, organizing the browsable representation in a hierarchical structure.

14. The computer program product of claim 11, further including a second executable portion for, pursuant to initializing the pseudo-volume, configuring at least one of the pseudo-volume, the diagnostic and statistical data, and the at least one parameter to be maintained by the storage controller in a storage location.

* * * * *